Oct. 31, 1944.                 C. C. CLARK                    2,361,457
                      AMINATED CHLORINATED PARAFFINS
                         Filed March 7, 1941
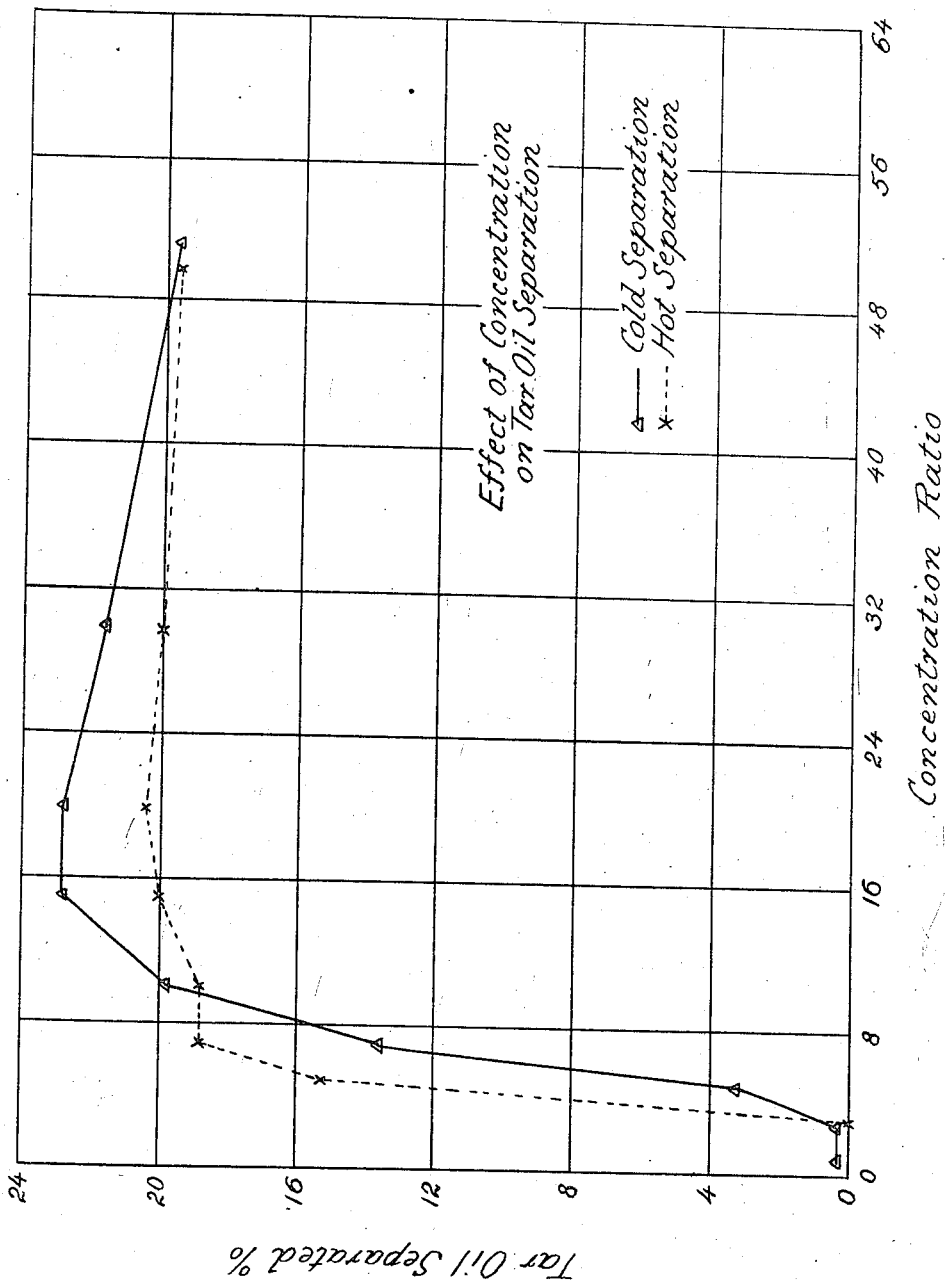
INVENTOR
Charles C. Clark
BY
Pennie, Davis, Marvin & Edmonds
ATTORNEY Patented Oct. 31, 1944

2,361,457

UNITED STATES PATENT OFFICE 2,361,457

AMINATED CHLORINATED PARAFFINS

Charles C. Clark, Buffalo, N. Y., assignor to The Mathieson Alkali Works, Inc., New York, N. Y., a corporation of Virginia Application March 7, 1941, Serial No. 382,211

4 Claims. (Cl. 260—585)

This invention relates to a process adapted for the production of new amino derivatives of chlorinated hydrocarbons which are useful as insecticides, antioxidants, wetting agents, pickling inhibitors, fungicides, emulsifying agents and as intermediates for the production of such materials as rubber accelerators.

The new compositions which may be produced by the process of the invention are amino derivatives of chlorinated paraffins. They are substantially free from constituents insoluble in dilute acids (the amino derivatives themselves are basic, and require the addition of acid for the formation of neutral aqueous solutions). The new compositions may be prepared as such, that is, as the free bases, or in the form of salts, for example, as salts with mineral acids such as hydrochloric or sulfuric acid, or with organic acids, particularly the fatty acids such as oleic acid. Many of these new compositions are exceptionally complex, and the various constituents of which they are composed have not been identified.

These new compositions may be prepared from various paraffins, including relatively pure paraffins, closely cut fractions from petroleum, or more complex mixtures. In general, the paraffins from which the products are prepared are those which are thinly liquid at ordinary temperatures, although heavier paraffins such as gas oils and even heavier oils or waxes may be used. Thus such paraffins or mixtures as commercial hexane, commercial dodecane, heptadecane, gasoline, kerosene and even gas oil or heavier products may be used. Products derived from kerosene have important advantages over other products for many of the uses indicated generally above, as the kerosene fractions of petroleum are sufficiently heavy to give very useful products while at the same time they are not particularly difficult to aminate, at least as compared with heavier hydrocarbons, and the losses in connection with their preparation are not excessive.

The new compositions are prepared advantageously by the direct amination of chlorinated paraffins through the use of ammonia at elevated temperatures. Such amination results in the formation of ammonium chloride as a by-product, and also in the formation of constituents which are insoluble in dilute acid or in neutralized aqueous solution, that is, in an aqueous solution containing sufficient acid so that the amino product is neutralized. In producing the new compositions by the process of the invention, these materials are removed, so that the final product is quite free from ammonium chloride and from this acid insoluble material.

In accordance with the present invention, the removal of the objectionable or undesirable acid insoluble constituents is accomplished by forming a dilute aqueous solution of the product resulting from the neutralization of the crude amino derivative. From such solution, the tarry, oily, undesirable or objectionable acid insoluble constituents separate and settle out. To accomplish this separation of these constituents, it is necessary to use a relatively large volume of water as compared with the volume of the amino derivative, as otherwise a suspension or emulsion is formed from which the insoluble oil does not readily precipitate and settle out. On the other hand, the amount of water used should not be much greater than the minimum amount required for effective separation, as otherwise the process is less economical, and, in some cases, is less effective.

This phenomenon is illustrated by the graph which is Figure 1 of the drawing. In this graph, the percent of tarry oil by weight separated from a typical amino derivative of chlorinated kerosene, based on the total weight of the sample, is plotted against the quantity of water used in the separation, for both cold separation and hot separation, the "concentration ratio" being the ratio of the volume of water (C. C.) per unit weight (grams) of the crude amino product. Visual inspection indicates that hot separation is somewhat more effective than cold separation. It will be noted that maximum separation, both for hot and cold separation, occurs when around 10 to 25 volumes of water are used per volume of amino derivative. Larger quantities of water will give effective separation, but with such larger quantities, there is, of course, an increase in cost. With reduction in the quantity of water, the effectiveness of the separation decreases rapidly.

Of course, the quantities of water required to give most effective separation will vary somewhat depending upon the degree of chlorination, the degree of amination, and the nature of the paraffins from which the products are derived, the appended chart showing the effect of dilution for a particular product derived from Michigan kerosene and hereafter described in detail in Example 1. In general, proportions of about 10 to 25 parts of water for each part of crude material give optimum separation without undue expense.

After the separation of the material insoluble in dilute acid, as described, the amino derivative may be separated, still as a crude product, from the water by the addition of caustic, for example, aqueous caustic soda. Upon such addition, the free amines are formed, and as they are insoluble in alkaline aqueous solution they separate from the solution.

In general, these crude amines are dark-colored, viscous, oily liquids having a specific gravity a little less than that of water. They are insoluble in water, but rather readily dissolve in mineral acids with evolution of heat. They are soluble in most organic solvents. They have an odor which is unpleasant. One particular product, derived from Michigan kerosene, having a nitrogen content of 6.1%, boiled over a range of 110–175° C. at 20 mm. of mercury, giving a distillate equal to about ⅔ the weight of the crude product charged to the still. One gram of this product was neutralized by 2.52 cc. of 3 N sulfuric acid in water solution using litmus indicator.

These crude products on distillation yield a distilled product and a residue. The distillates are usually yellow to brown liquids having an ammoniacal odor. They darken on aging due to absorption of oxygen. They decompose on boiling at atmospheric pressure. They are insoluble in water but soluble in mineral acids.

The residues remaining on such distillation are dark brown or black, hygroscopic solids. The amine residues are soluble in water forming solutions which are probably colloidal. They are further soluble in methyl and ethyl alcohol and in chloroform, but are insoluble in ether, acetone, gasoline and kerosene, and only slightly soluble in carbon tetrachloride and benzol. When either dilute acid or dilute alkali is added to an aqueous solution (the aqueous solution being neutral), a precipitate is formed. A portion of the amine residue is soluble in dilute acid. One product derived from Michigan kerosene sintered at 50–60° C. and became soft and viscous at 100° C. This product contained about 4.9% nitrogen.

While in the foregoing description, specific data with respect to certain products derived from kerosene have been given, it is to be understood that these are properties of the particular product hereinafter described in detail in Example 1, and that other amino derivatives of chlorinated kerosene, while generally similar in properties, will contain somewhat more or somewhat less nitrogen or chlorine, depending somewhat upon the particular kerosene used and upon the conditions of production, while products derived from other paraffins will also differ in various properties.

The invention will be further illustrated by the following specific examples, but it is not limited thereto.

*Example 1.*—10 gallons of kerosene obtained from the refining of Michigan crude oil of the Mount Pleasant type were placed in a glass vessel heated by a water bath. The kerosene was irradiated with light from four 150 watt bulbs mounted above the vessel. The temperature of the bath was maintained by steam at about 70° C. A stream of chlorine gas was passed into the kerosene at a rate of 1.5–2 pounds per hour for from 50 to 70 hours to produce a chlorinated kerosene containing around 41% chlorine. The hydrogen chloride liberated was absorbed in water by suitable means. The kerosene used in this case had an A. P. I. gravity of 46.8 and a distillation range of 360–519° F. 112 pounds of chlorinated kerosene were obtained.

13 pounds of this chlorinated kerosene were placed in an iron autoclave along with 8.0 pounds of liquid ammonia and 9.1 pounds of a mixture consisting of 90% ethyl alcohol and 10% methyl alcohol by volume. The autoclave was closed and heated for six hours at 125° C., after which the charge was blown down to atmospheric pressure in a water cooled steel vessel and filtered to remove the 4.5 pounds of ammonium chloride which were formed in the reaction. The solvent was removed by distillation at atmospheric pressure.

8 pounds of a crude amino reaction product were obtained. To this crude product were added 2.85 pounds of 37% hydrochloric acid with stirring. The mixture was neutral to litmus after the addition of acid. It was poured into 20 gallons of boiling water and the boiling continued for about an hour. The source of heat was then removed and the solution allowed to stand for 8 to 12 hours, with separation of 1.5 pounds of a moderately viscous, black oil which was removed from the bottom of the vessel and discarded.

After the removal of this oil, 1.73 pounds of 50% aqueous caustic soda were added to the clear supernatant liquid. The free crude amines which were released and were insoluble in the alkaline solution separated at the top of the solution. 6 pounds of the crude amine were obtained.

The crude amines so obtained were brown to black, viscous, oily liquids, specific gravity 0.953, boiling range 110–175° C. at 20 mm. of mercury. The product is insoluble in water but readily dissolves in mineral acid. One gram requires 2.52 cc. of 3 N sulfuric acid to make it neutral to litmus in water solution. It has a nitrogen content of about 6.1% and a chlorine content of about 8.42%. The odor of the product suggests ammonia, but is heavier and undesirable. It does not have the fish-like odor of trimethyl amine. This crude product is an insecticide, and mineral acid derivatives of it are excellent inhibitors for use in pickling steel.

The crude product so produced was distilled at 25 mm. pressure in a vacuum still heated by an oil bath. The first distillate appeared at 115° C. and the last came over at 178° C. 5.4% water, 59.5% distilled amines, and 29.8% residue were obtained with 5.4% loss, at least partly due to uncondensed water vapor. The distilled amine, that is the distillate, is a yellow to brown liquid with about the same viscosity as kerosene. It has an ammoniacal odor and darkens on aging due to absorption of oxygen. On boiling at atmospheric pressure the product decomposes. At 25 mm. the boiling range is 115–175° C. It is insoluble in water but soluble in mineral acids, one gram dissolving in 2.29 cc. of 3 N sulfuric acid to give a neutral solution. The product contains 8.83% chlorine and about 7% nitrogen. It is soluble in most organic solvents. The average molecular weight of the product is 241 as determined by the freezing point method, the specific gravity 0.933 at 25° C., the index of refraction 1.4855 at 21° C., the iodine value 151.

This product is useful as an insecticide, antioxidant and wetting agent in aqueous acid systems. The oleate, or other fatty acid derivative, is useful as a fungicide and an emulsifying agent, as pigment wetting agents in grinding paint or the like, and for other purposes. The carbon bisulfide derivatives of the distilled product are useful as rubber accelerators, fungicides, etc.

The residue remaining from the distillation is a dark brown, hygroscopic, brittle solid which sinters at 50–60° C. and becomes soft and viscous at 100° C. It contains 4.9% nitrogen and 14.4 chlorine. It is colloidally soluble in water, soluble in methyl and ethyl alcohols and in chloroform. It is insoluble in ether, acetone, gasoline and kerosene, and only slightly soluble in carbon tetrachloride and benzol. This residue contains an acid soluble fraction which is a good pickling inhibitor. The residue itself has fungicidal properties. A water solution of the residue is neutral to litmus, and the addition of either dilute acid or dilute alkali to this solution forms a precipitate.

In the foregoing example, the chlorinated kerosene from which the amino product was produced had a chlorine content of about 41%. This corresponds to about 3 atoms of chlorine per molecule of hydrocarbon, and a kerosene chlorinated to this degree seems to be the most useful in producing the new products. If a kerosene chlorinated to a lower degree, for example, around 23% chlorine, corresponding to about 1.5 atoms of chlorine per molecule of hydrocarbon, is used, the yield of amino derivatives is radically reduced. Nevertheless, chlorinated kerosene with more or less chlorine than 41% may be used, but the properties of the final product, and the yield, will vary from those given in the specific example.

Similarly, the conditions of the amination, for example, the temperature, etc., may be varied over a relatively wide range.

*Example 2.*—7 parts of chlorinated commercial hexane, containing 57.5% of chlorine, were placed in an autoclave with 4.5 parts of ethyl alcohol and 8 parts of liquid ammonia. The mixture was heated for six hours at 125° C. after which the product was removed from the autoclave, the ammonium chloride formed was filtered out and the alcohol removed by distillation. 11 parts of ammonium chloride were formed and 5 parts of crude reaction product obtained. This product was neutralized with dilute sulfuric acid and the neutralized product was diluted with water, using 20 parts of water for each part of crude product. The resulting solution was boiled for one hour and allowed to cool and settle. 0.25 part of acid insoluble oil separated. An excess of caustic soda was then added and the solution stirred, whereupon 4.5 parts of crude amine separated.

*Example 3.*—105 parts of chlorinated commercial dodecane containing 47.5 parts of chlorine were heated for six hours at 125° C. in an autoclave with 70 parts of alcohol and 119 parts of ammonia. The resulting product was worked up in a manner similar to that described in Example 2, using 15 parts of water per part of crude product in the dilution operation. 91 parts of ammonium chloride, 26.3 parts of acid insoluble oil and 37.2 parts of crude amine were obtained.

*Example 4.*—6.1 parts of chlorinated heptadecane containing 41.5% of chlorine, 4.5 parts of alcohol and 5 parts of ammonia were heated in an autoclave at 125° C. for several hours. The resulting product was worked up in the manner described in Example 2. 3 parts of ammonium chloride, 4 parts of acid insoluble oil and 2.2 parts of crude amine were obtained. 20 parts of water to one part of crude product were used in the dilution operation.

The products of Examples 2 through 4, as well as other products derived from various paraffins, including relatively pure paraffins or closely cut fractions and complex mixtures of paraffins such as occur in gasoline, kerosene, gas oil, etc., may be subjected to distillation with the production of distillates and residues having properties generally similar to the properties of the materials described in detail in Example 1, but, of course, differing therefrom both in chlorine and nitrogen content, boiling point, etc., depending upon the paraffin used, the degree of chlorination, the degree of amination, etc.

I claim:

1. The process of preparing aminated, chlorinated paraffins which comprises aminating a chlorinated paraffin with ammonia with heat and pressure, separating the ammonium chloride which forms, neutralizing the aminated product, forming a dilute aqueous solution of the neutralized product in which the concentration ratio is not less than about 6 and separating undissolved material therefrom.

2. The process of preparing aminated, chlorinated kerosene which comprises aminating a chlorinated kerosene with amonia with heat and pressure, separating the ammonium chloride which forms, neutralizing the aminated product, forming a dilute aqueous solution of the neutralized product in which the concentration ratio is not less than about 6 and separating undissolved material therefrom.

3. The process of preparing aminated, chlorinated paraffins which comprises aminating a chlorinated paraffin with ammonia with heat and pressure, separating the ammonium chloride which forms, neutralizing the aminated product, forming a dilute aqueous solution of the neutralized product in which the concentration ratio is not less than about 6, separating undissolved material therefrom, liberating the aminated product as the free base and distilling.

4. The process as in claim 2, in which the chlorinated kerosene used contains about three atoms of chlorine per molecule of kerosene.

CHARLES C. CLARK.